United States Patent
Watkin

(10) Patent No.: US 10,316,674 B2
(45) Date of Patent: Jun. 11, 2019

(54) CARRIERS FOR TURBINE COMPONENTS

(71) Applicant: ROLLS-ROYCE PLC, London (GB)

(72) Inventor: Meirion Watkin, Derby (GB)

(73) Assignee: ROLLS-ROYCE plc, London (GB)

( * ) Notice: Subject to any disclaimer, the term of this patent is extended or adjusted under 35 U.S.C. 154(b) by 651 days.

(21) Appl. No.: 14/865,943

(22) Filed: Sep. 25, 2015

(65) Prior Publication Data
US 2016/0090840 A1   Mar. 31, 2016

(30) Foreign Application Priority Data

Sep. 29, 2014 (GB) .................................. 1417150.8

(51) Int. Cl.
| | |
|---|---|
| *F01D 9/04* | (2006.01) |
| *F01D 25/14* | (2006.01) |
| *F01D 25/24* | (2006.01) |
| *F01D 5/02* | (2006.01) |

(52) U.S. Cl.
CPC ................. *F01D 9/04* (2013.01); *F01D 5/02* (2013.01); *F01D 9/042* (2013.01); *F01D 25/14* (2013.01); *F01D 25/246* (2013.01); *F05D 2240/11* (2013.01); *F05D 2240/91* (2013.01); *F05D 2250/184* (2013.01); *F05D 2250/611* (2013.01); *Y02T 50/675* (2013.01)

(58) Field of Classification Search
CPC .......... F01D 9/04; F01D 11/08; F01D 11/122; F01D 25/14; F05D 2240/11
See application file for complete search history.

(56) References Cited

U.S. PATENT DOCUMENTS

| | | | | |
|---|---|---|---|---|
| 6,139,257 A | * | 10/2000 | Proctor .................... | F01D 9/04 415/115 |
| 6,575,694 B1 | | 6/2003 | Thompson et al. | |
| 6,679,680 B2 | * | 1/2004 | Um ...................... | B23K 1/0008 415/173.1 |
| 7,908,867 B2 | * | 3/2011 | Keller .................... | F01D 9/023 415/173.4 |
| 9,759,092 B2 | * | 9/2017 | Moreton .................. | F01D 9/00 |

FOREIGN PATENT DOCUMENTS

| | | |
|---|---|---|
| EP | 1467066 A2 | 10/2004 |
| EP | 1 533 478 A2 | 5/2005 |
| EP | 1887191 A2 | 2/2008 |
| WO | 96/17156 A1 | 6/1996 |
| WO | 2009/035487 A1 | 3/2009 |

OTHER PUBLICATIONS

Mar. 10, 2016 Search Report issued in European Patent Application No. 15186797.
Mar. 27, 2015 Search Report issued in British Patent Application No. 1417150.8.

* cited by examiner

*Primary Examiner* — Justin D Seabe
*Assistant Examiner* — Juan G Flores
(74) *Attorney, Agent, or Firm* — Oliff PLC

(57) ABSTRACT

A carrier segment for forming a carrier section for one or more gas turbine engine components, the carrier segment including a carrier wall extending between front and rear carrier ends and having a circumferential profile, the carrier segment being configured for defining radially inwardly thereof a chamber for receiving cooling air from an outboard feed source via the front end, wherein the circumferential profile of the carrier wall is undulating, e.g. with a simple waveform configuration or a more complex arrangement of interleaved series of oppositely oriented part-conical surface formations.

21 Claims, 9 Drawing Sheets

CARRIERS FOR TURBINE COMPONENTS

TECHNICAL FIELD

This invention relates to carriers for components of a gas turbine engine. More particularly, though not exclusively, the invention relates to improvements in the geometry of carriers, and segments for forming such carriers, for turbine components requiring especially high or efficient levels of cooling, such as nozzle guide vanes (NGVs), turbine blades, as well as other components.

BACKGROUND OF THE INVENTION AND PRIOR ART

FIG. 1 of the accompanying drawings is a schematic representation of a known aircraft ducted fan gas turbine engine 10 comprising, in axial flow series: an air intake 12, a propulsive fan 14 having a plurality of fan blades 16, an intermediate pressure compressor 18, a high-pressure compressor 20, a combustor 22, a high-pressure turbine 24, an intermediate pressure turbine 26, a low-pressure turbine 28 and a core exhaust nozzle 30. A nacelle 32 generally surrounds the engine 10 and defines the intake 12, a bypass duct 34 and a bypass exhaust nozzle 36. Electrical power for the aero engine and aircraft systems is generated by a wound field synchronous generator 38. The generator 38 is driven via a mechanical drive train 40 which includes an angle drive shaft 42, a step-aside gearbox 44 and a radial drive 46 which is coupled to the high pressure compressor 34 via a geared arrangement.

Air entering the intake 12 is accelerated by the fan 14 to produce a bypass flow and a core flow. The bypass flow travels down the bypass duct 34 and exits the bypass exhaust nozzle 36 to provide the majority of the propulsive thrust produced by the engine 10. However, a proportion of the bypass flow is taken off and fed internally to various downstream (hot) portions of the engine to provide a flow of relatively cool air at locations or to components as or where necessary. The core flow enters, in axial flow series, the intermediate pressure compressor 18, high pressure compressor 20 and the combustor 22, where fuel is added to the compressed air and the mixture burnt. The hot combustion gas products expand through and drive the sequential high 24, intermediate 26, and low-pressure 28 turbines before being exhausted through the nozzle 30 to provide additional propulsive thrust. The high, intermediate and low-pressure turbines 24, 26, 28 respectively drive the high and intermediate pressure compressors 20, 18 and the fan 14 by interconnecting shafts 38, 40, 42.

In modern gas turbine engines the high pressure (HP) turbine gas temperatures are often now much hotter than the melting point of the materials commonly used for many of the HP turbine components, such as nozzle guide vanes (NGVs), turbine blades, as well as various other static and/or rotary parts (e.g. carriers, shrouds, platforms, etc) of the engine structure used to mount, support, carry or surround such components. It is therefore necessary to provide particularly efficient cooling of such components. In some engines efficient cooling also of components of the intermediate and low pressure turbines 26, 28 may also be especially desirable.

One of the challenges faced by engine designers is how to efficiently deliver a desired amount of cooling air, which is supplied from the HP compressor 20 having bypassed the combustor, to the required locations to the relevant components downstream of the combustor. This is often difficult, taking into account the complex engine architecture and the fact that many of the components in question that need most cooling are associated with especially high temperatures and mechanical stresses when in operation, which makes the accommodation of differential expansion of such components and/or their carriers, shrouds, platforms, etc also a particularly challenging task.

A feature of a typical modern engine in respect of which efficient delivery of cooling air to hot components is especially important is the carrier portion of the HP turbine section which supports the NGVs and the segments of which at least partially surround the turbine blades. This particular section of a typical engine is shown in FIGS. 2 and 3(a), (b) and (c) of the accompanying drawings. Here a series of segments 50 are united together circumferentially around the engine to form a complete, generally annular, segmented blade track liner section or ring for supporting the NGVs and partially enshrouding the turbine blades (not shown). The segments 50 are disposed radially inwardly of the engine outer casing (components of which are shown generally as 46), and also shown here are flap seal 47 for pinning to an NGV, recess 48 for accommodating a respective NGV anti-rotation lug, an anti-rotation lug 56 for anchoring the segment 50 (or rather anchoring the carrier 60 which carries the segment 50) in place relative to the casing 46, and flap plate rail or flange 49 for use in the sealing arrangement to form a seal between the hot inboard region and the cooler outboard region within the HP turbine architecture.

Each segment 50 is carried by a generally flat carrier 60 in the form of a wall defining radially inwardly thereof (i.e. therebeneath, in the orientation shown in FIGS. 2 and 3) part of a radially inward main cooling chamber 70 for receiving cooling air from an outboard feed source via a series of elongate conduits 90 formed in a forward end wall section 52F of the carrier 60 (or segment 50). The main cooling chamber 70 is that section of the arrangement which at least partially enshrouds the turbine blades. The carrier 60 also defines radially outwardly thereof (i.e. thereabove, in the orientation shown in FIGS. 2 and 3) a radially outward secondary chamber 80 which ideally needs to be thermally divorced from (or rather "stagnant" relative to) the main cooling chamber 70 in order to optimise the latter's cooling efficiency. Because of the high axial thrust loads typically exerted by the NGVs on the carrier 60 during use, the carrier 60 is arranged so as to extend between the front 52F and rear 52R end sections or walls of the carrier 60 (or segment 50) at an inclined angle relative to the engine axis.

With this known arrangement, however, the efficient delivery of cooling air to the main radially inward cooling chamber 70 presents practical difficulties. The main issue is how to get sufficient flow rates of cooling air from the outboard feed source into the radially inward cooling chamber 70 efficiently, yet past the critical sealing arrangement involving the flap plate rail or flange 49 which separates and seals the hot NGV-containing region from the cooler outboard region via which the cooling air is fed. Because of the loading necessity for the inclined carrier wall 60 to have its front end at a radially inward location relative to the radially outward cooling air feed source, where the front end section 52F of the carrier 60 (or segment 50) is at its fattest, the fact that the flap plate rail sealing flange arrangement 49 in effect blocks easy access from the outboard feed source to the main cooling chamber 70 leads to a difficulty in providing a localised geometry or architecture that meets these conflicting requirements in an efficient manner.

Current designs of carriers and segments address this issue by using a series of elongate conduits 90 cast or drilled through the front end section or wall 52F of each carrier 60 (or segment 50). However this involves either drilling through large volumes of material, which is time-consuming, costly and wasteful, or alternatively using complex casting techniques, which is also time-consuming and costly. It is not possible simply to move the conduits 90 radially outwardly so as not to have to pass through the large volumes of carrier end section or wall 52F, because this would still involve drilling through at least two wall sections, which defeats the object.

Thus there is a need in the art for a more efficient way of meeting the above conflicting criteria and providing a more efficient arrangement for enabling sufficient flow rates of cooling air from an outboard feed source into the radially inward cooling chamber 70 without having to pass the NGV sealing arrangement. This is therefore a primary object of the present invention.

SUMMARY OF THE INVENTION

Accordingly, aspects of the present invention relate to a carrier segment for forming a carrier section for components of a gas turbine engine, a carrier section formed from a plurality of the segments, and a gas turbine engine including the carrier section.

In a first aspect the present invention provides a carrier segment for forming a carrier section for one or more gas turbine engine, the carrier segment including a carrier wall extending between front and rear carrier ends and having a circumferential profile arranged on an engine axis, the carrier segment being configured for defining radially inwardly of the circumferential profile a chamber for receiving cooling air from an outboard feed source via said front end, wherein the circumferential profile of the carrier wall is undulating.

In some embodiments the carrier wall may have a substantially uniform cross-sectional thickness.

In some embodiments the carrier wall may have radially outer and inner faces, at least the radially inner one of which, preferably both of which, have an undulating surface profile defined by a wave function. Preferably each of the faces of the carrier wall is substantially smooth, to facilitate airflow thereacross or therepast. Preferably each of the faces of the carrier wall is substantially continuous traversing longitudinally between the front and rear carrier ends.

In some simple embodiments, which may possibly be less preferred, the carrier wall may have an undulating wave profile which is substantially identical in any given circumferential direction at any longitudinal location between the said front and rear carrier ends.

However, in other, and indeed generally preferred, embodiments the carrier wall may have an undulating wave profile which varies in wave function and/or wavelength in a plurality of circumferential directions traversing longitudinally between the said front and rear carrier ends. In some particularly preferred such embodiments the varying wave function and/or wavelength in a circumferential direction varies substantially continuously and evenly traversing longitudinally between the said front and rear carrier ends.

In preferred embodiments it may be preferable that at least the wave function, and preferably the wave function and also the wavelength, of the carrier wall profile in a circumferential direction varies symmetrically traversing in opposite longitudinal directions to either side of a longitudinally central circumferential direction midway between the said front and rear carrier ends.

It is to be understood that in many preferred embodiments a primary reason for designing the undulating wave profile of the carrier wall such that it has a non-uniformly undulating wave function traversing longitudinally between the front and rear carrier ends is so that the resulting carrier wall has a desirable relatively high degree of strength, stiffness, and resistance against deforming, twisting or bending. This is especially in view of the fact that the carrier wall may typically experience high axial thrust loads exerted by the NGVs and/or other components during use.

In some embodiments the carrier wall may have a front end edge profile which is defined by a first wave function and a first wavelength, and a rear end edge profile which is defined by a second wave function and a second wavelength, wherein:

(i) the first and second wave functions may be substantially the same or substantially different from each other; and/or (ii) the first and second wavelengths may be substantially the same or substantially different from each other.

In certain of the preceding embodiments the first wave function may be substantially an inverse of the second wave function (or vice versa).

In some particularly preferred such preceding embodiments the first wavelength may substantially equal the second wavelength but the first and second wave functions may be offset relative to one another in a circumferential direction by half of the undulating wavelength.

In preferred forms of such embodiments the wave function which defines the circumferential carrier wall profile starting from the front carrier end may vary, especially may decrease, in amplitude as the wave function traverses longitudinally towards the rear carrier end, and the wave function which defines the circumferential carrier wall profile starting from the rear carrier end may vary, especially may decrease, in amplitude as the wave function traverses longitudinally towards the front carrier end.

In one particularly preferred form of such embodiments, the carrier wall may comprise a front portion and a rear portion, the front portion having a profile comprising a series of a plurality of first part-conical surface formations, and the rear portion having a profile comprising a series of a plurality of second part-conical surface formations, wherein the series of first part-conical surface formations are at least partially interleaved in a circumferential direction with the series of second part-conical surface formations, and wherein the series of first and second part-conical surface formations are inverted in a front-to rear sense relative to each other, with the wider ends of the conical surfaces of each of the first and second series being located respectively at the front and rear ends, as the case may be, of the carrier segment.

In such embodiments the respective conical surfaces of the first and second series may preferably be of substantially the same shape or profile as each other, so that the overall carrier wall is substantially symmetrical either side of a centreline or median plane bisecting the carrier wall midway between its front and rear ends.

In typical preferred such embodiments of such carrier segments there may be provided for example 3, 4 or 5 part-conical surface formations in each said series. Other numbers of such waveform surface formations may be possible, depending on the overall size and geometry of the carrier segment. (It is to be understood that like numbers of undulations of other configurations may be provided in other embodiments.)

It is a primary and unique feature of the invention that the carrier wall of the or each carrier segment has an undulating profile, especially an undulating waveform surface profile. It is to be understood that a primary reason for designing the carrier wall with this configuration is that it permits easier access to the cooling chamber defined radially inwardly of the carrier wall by feeding air through one or more appropriate conduits in the front end wall or section of the carrier segment from the outboard feed source. Because of the undulations in the carrier wall, access to the cooling chamber within each upwardly extending undulation is achievable at a relatively further radially outward location than is possible in known designs where the carrier wall is flat. Thus it is possible, and easier, to provide access to the cooling chamber from the outboard cooling air source by providing the necessary one or more conduits through the front end wall or section of the carrier segment at a relatively radially outward location without having to pass or work around or through the NGV sealing flange arrangement typified by the flap plate rail or flange (49 in FIGS. 2 and 3). It also means that the cooling air feed conduit(s), channel(s) or through-hole(s) may be formed by passage through less (i.e. through reduced thickness(es)) of cast wall material, which may lead to practical production advantages associated with less drilling or easier casting.

Accordingly, in preferred embodiments of the carrier segment of the invention the front end carrier wall or section may comprise at least one, preferably a plurality of, conduits, channels or through-holes therethrough for passage of cooling air from an outboard feed source into the chamber defined radially inwardly of the carrier wall. Preferably the or each such conduit, channel or through-hole is located such that at least its exit into the said chamber lies within a respective radially-outwardly-pointing or -extending undulation of the carrier wall on the chamber side of the front end wall. It is possible for all, or alternatively only some of (e.g. alternate ones or other regularly spaced ones) of the respective radially-outwardly-pointing or -extending undulations of the carrier wall on the chamber side of the front end wall to be provided with a respective conduit, channel or through-hole. Moreover such conduits, channels or through-holes may be oriented at any suitable orientation or angle relative to the engine axis, for example depending on the precise optimum geometry of the overall arrangement.

It is a further advantage of the invention that the novel positioning of the conduits, channels or through-holes for providing improved access to the radially inward cooling chamber may also facilitate the provision therein of one or more sensors or other monitoring or control devices (e.g. in an experimental or test engine or even possibly in an in-use engine), which may require connection to external electrical control cabling. Thus, by providing an extra such conduit, channel or through-hole at a corresponding radial location to the others used to feed cooling air in to the chamber, or possibly by using one of the latter ones themselves, it is possible again to bypass the NGV-supporting flap plate rail or flange sealing arrangement which would otherwise make ready access to the interior of the cooling chamber from the outboard side of the engine, including for such a sensor and cabling arrangement, difficult.

In embodiments of the invention a wide variety of waveform shapes or functions may be used to define the undulating pattern in a circumferential direction at any particular longitudinal position traversing the carrier wall between its front and rear ends. For example, the undulating shape may be a waveform of any suitable mathematical function. The waveform is preferably a regular repeating wave having a constant or a regularly varying wavelength and/or amplitude.

By way of example, the wave function may define a relatively simple shape such as a part-cylindrical, part-polygonal, part-spherical, part-parabolic or part-hyperbolic curve. Alternatively, the wave function may define a more complex shape derived from any combination of two or more of any of the aforesaid curves, shapes or mathematical functions. Other mathematical functions defining the waveform(s) may also be possible.

In some embodiments of the invention the general orientation of the carrier wall may if desired or necessary be such that it lies in a general direction such that it extends between the front and rear carrier ends at an inclined angle, e.g. in the range of from about 10° or 15° or 20° up to about 30°, 40°, 50° or 60° relative to the engine axis, which may typically be of the same order of angular inclination as the known planar carrier walls of the known carrier segments discussed above and shown in FIGS. 2 and 3.

In some embodiments the carrier wall may have an undulating shape function which varies substantially uniformly and continuously traversing in a circumferential direction therearound or thereacross in a circumferential direction. This may for example be important in arranging for pairs of like carrier segments to be attachable together in the process of building up a complete annular carrier section or ring from a plurality of like carrier segments.

In this respect, in some embodiments the carrier segment may include a circumferential terminal portion at one circumferential end thereof which terminates with an edge profile which substantially matches an edge profile of a circumferential terminal portion at an opposite circumferential end of a second, like carrier segment, whereby the two carrier segments are unitable together via their respective circumferential ends to form a carrier segment pair.

In a corresponding manner to the above, a plurality of like carrier segments may thus be united together to build up a complete carrier section, e.g. in the form of an annular array or ring.

To facilitate this, in preferred practical embodiments of the invention the or each carrier segment may be slightly curved or arcuate in a circumferential direction, so that it may form a segment of an overall carrier ring which may be e.g. generally circular.

Such joining together of adjacent carrier segments may be by any suitable connection device or technique, examples of which are readily available to the skilled person and in current practice in the art. To assist in the secure and stable interconnection of adjacent pairs of carrier segments, the or each carrier segment may incorporate or be provided with at least one strip seal element or member, e.g. provided in a respective end groove or other locating device, at or on or in at least one of its circumferential terminal end portions.

In a second aspect the present invention provides a carrier section for supporting or at least partially enshrouding one or more gas turbine engine components, the carrier section comprising a plurality of carrier segments according to the first aspect of the invention or any embodiment thereof.

In a third aspect the present invention provides a gas turbine engine comprising a carrier section according to the second aspect or any embodiment thereof.

Within the scope of this application it is expressly envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

BRIEF DESCRIPTION OF THE DRAWINGS

Embodiments of the invention will now be described in detail, by way of example only, with reference to the accompanying drawings, in which.

DETAILED DESCRIPTION OF EMBODIMENTS OF THE INVENTION

Figure 1:
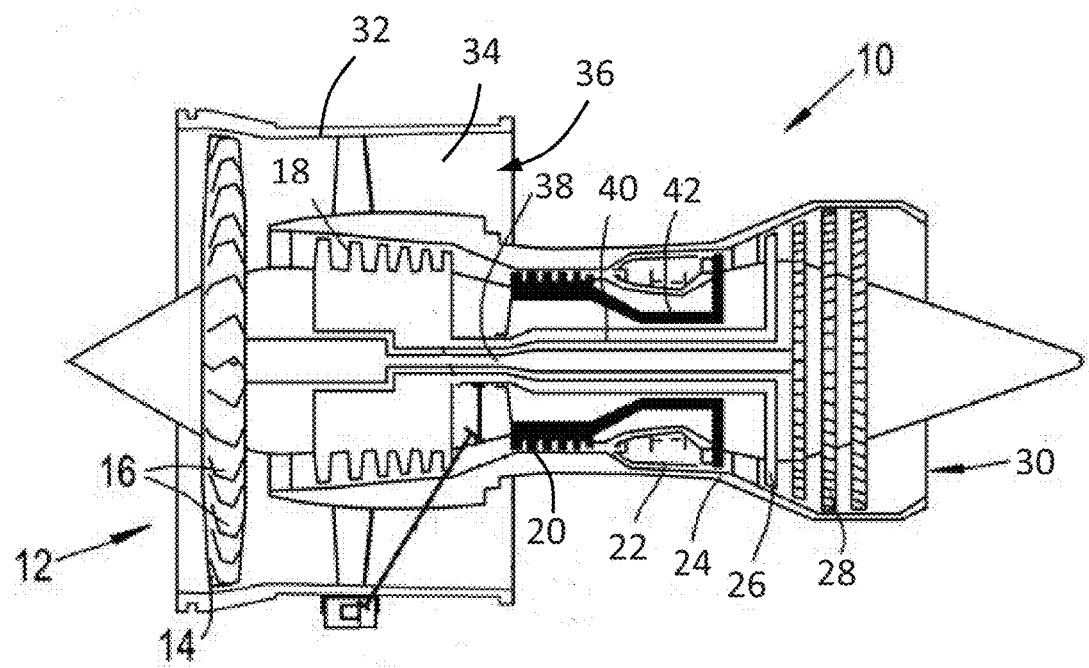
FIG. 1 is a schematic cross-sectional representation of a known aircraft ducted fan gas turbine engine, illustrating its main component sections, and has already been described.
Figure 2:
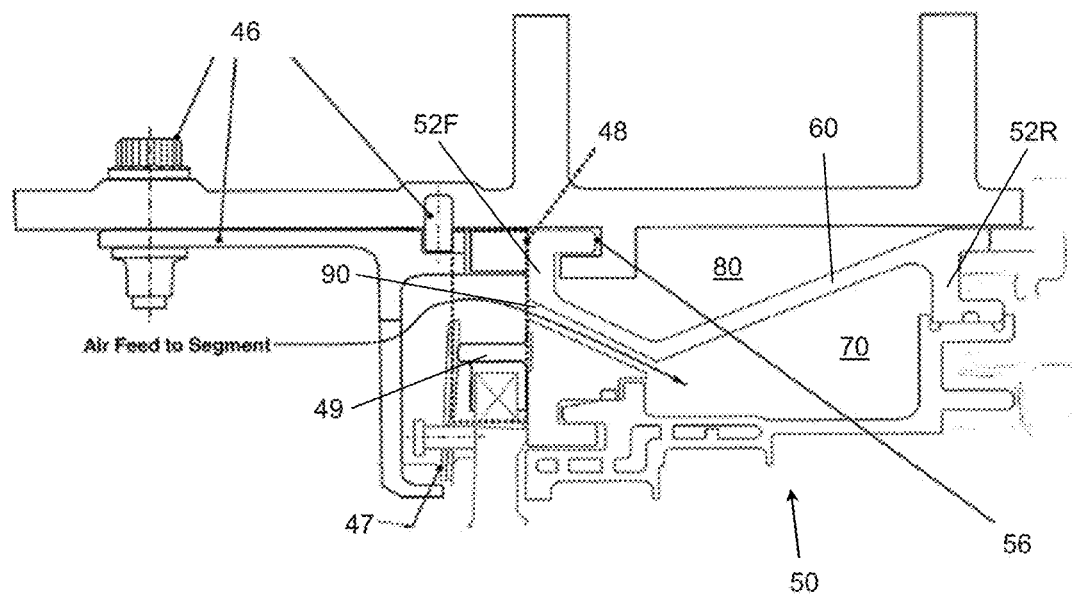
FIG. 2 is a cross-sectional view of a typical known HP turbine carrier section which supports the NGVs and at least partially surrounds the turbine blades, and has already been described.
Figure 3A:
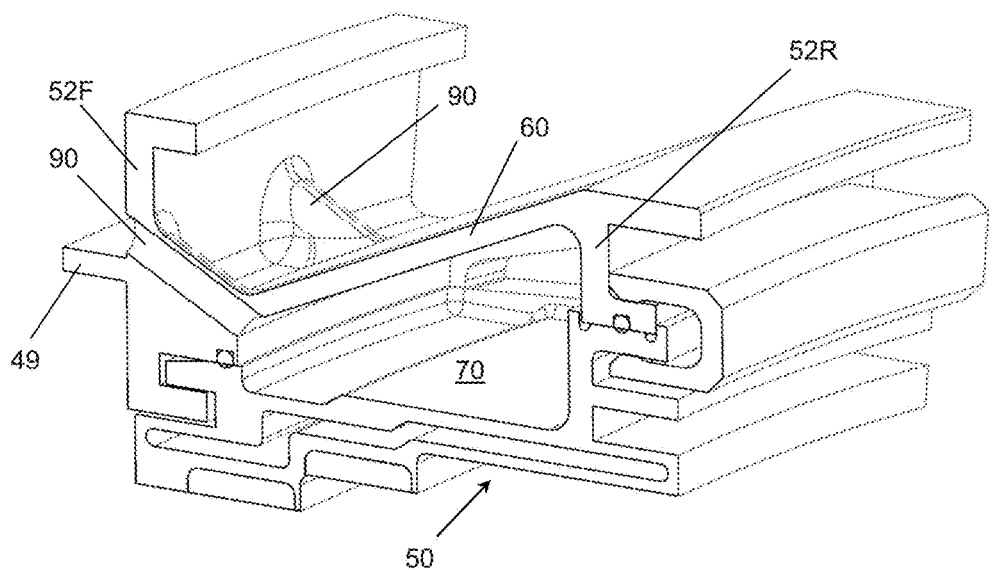
FIGS. 3(a), 3(b) and 3(c) are, respectively, a front perspective cut-away view of the section shown in FIG. 2, another front perspective cut-away view much the same as FIG. 3(a) but showing the sectional detail more clearly, and a rear perspective cut-away view of the same arrangement shown in FIG. 3(b), all of which have already been described.
Figure 3B:
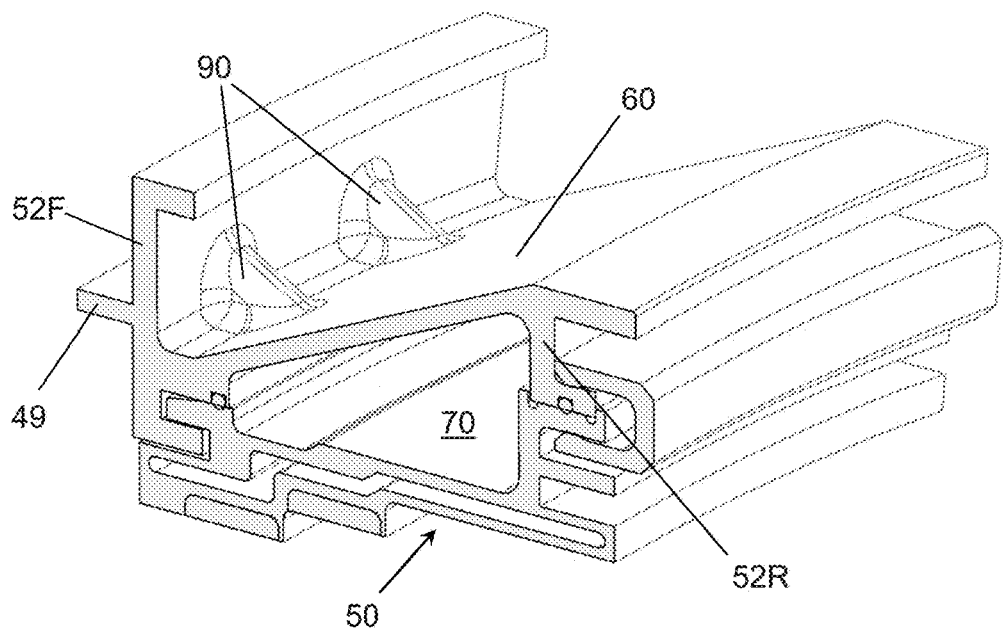
Figure 3C:
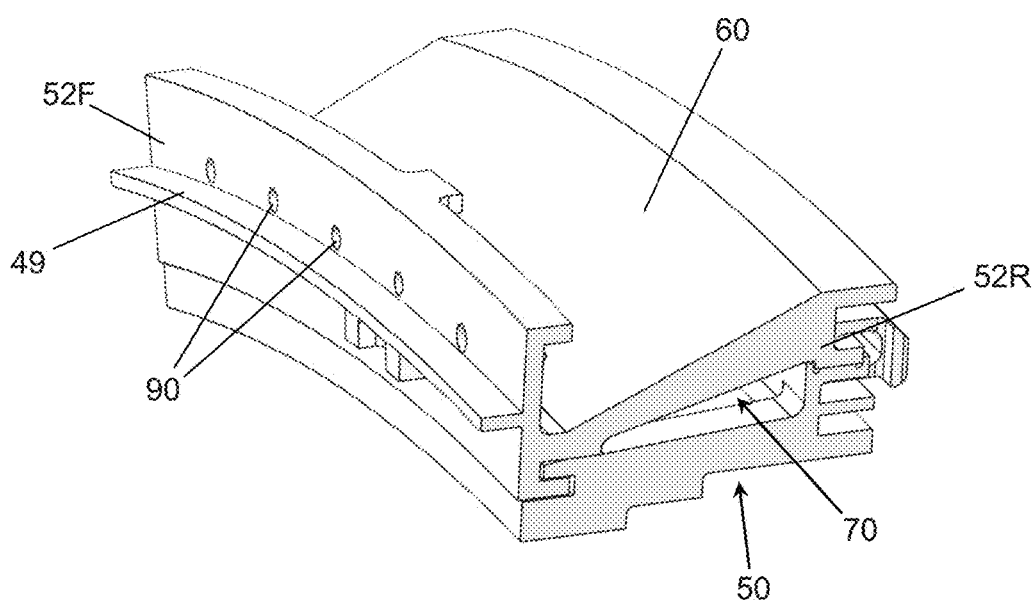
Figure 4:
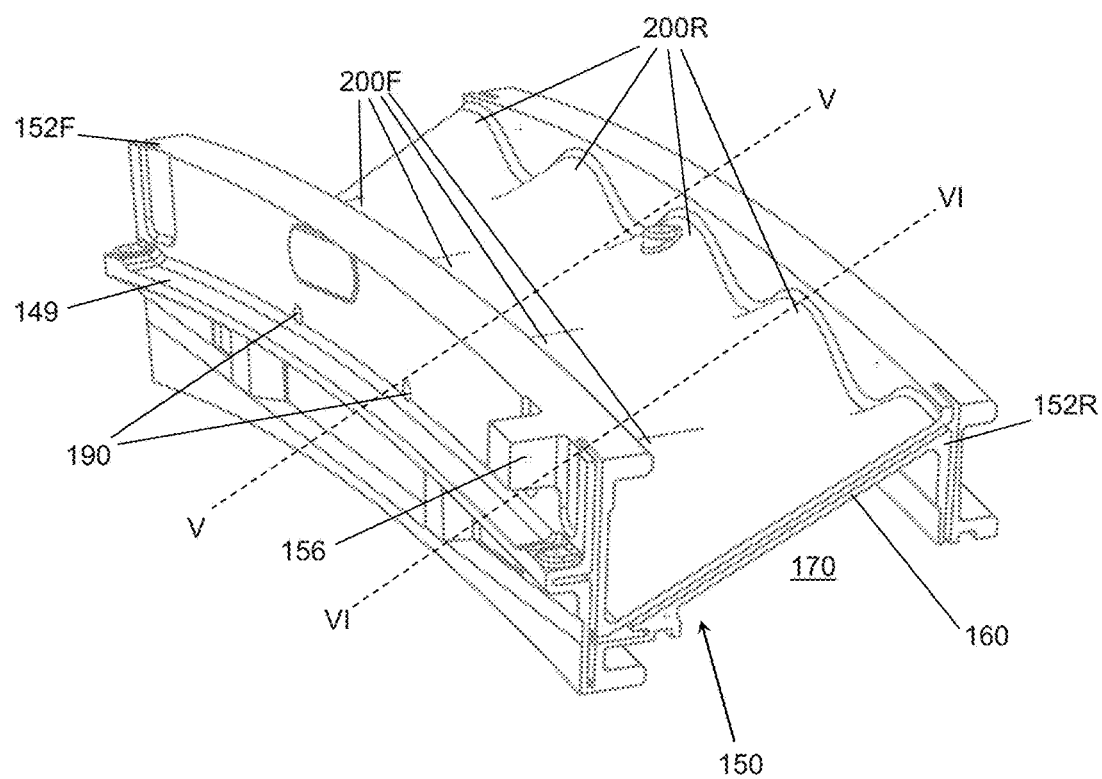
FIG. 4 is a perspective view of a carrier segment for use in an HP carrier section in accordance with a first embodiment of the present invention.

Referring firstly to FIG. 4 (FIGS. 1, 2, 3(a) and 3(b) having already been described in the context of the prior art), here there is shown a first embodiment of the invention, showing a single carrier segment 150 comprising front end wall or section 152F and rear end wall or section 152R. Extending longitudinally (relative to the engine axis) between the front and rear ends sections 152F, 152R is carrier wall 200F, 200R, which has an example of the characteristic new shape and/or configuration in accordance with this embodiment of the invention. The front end section 152R includes a flap plate rail or flange 149 for supporting and pinning to an NGV (not shown), which also forms part of the important sealing arrangement in this region of the engine for isolating the inboard hot section containing the NGVs, turbine blades, etc. from the outboard region containing the cooling air feed source.

The carrier wall 200F, 200R itself is of substantially uniform thickness, e.g. of a few millimetres (e.g. from about 0.5 or 1 or 2 mm up to about 3 or 4 or 5 or 8 or even up to about 10 mm or more), as is typical for existing carrier walls of known carrier segments and is provided at at least one of (or possibly both of) its circumferential end edge portions with a or a respective strip seal element 160, e.g. seated in a respective sealing groove, for effecting an airtight seal as one carrier segment 150 is joined to a neighbouring like segment 150 in the building up of a complete annular carrier section or ring for completely circumscribing this region of the engine.

The carrier wall 200F, 200R has an undulating profile with a unique waveform shape. In the example shown here in this first embodiment the carrier wall is made up of a pair of series of approximately part-conical-shaped surface formations 200F, 200R, a first series 200F having their widest conical ends located at or toward the front end 152F and a second series 200R having their widest conical ends located at or toward the rear end 152R. The part-conical formations in each series 200F, 200R are interleaved with each other, going in a circumferential direction. The part-conical surfaces of the formations in each series 200F, 200R decrease in amplitude going from their respective root ends (at the front and rear carrier segment ends 152F, 152R, respectively), and reach their minimum radius for example at a longitudinal location approximately 50 to 95%, preferably 60 to 80 or 90%, of the distance longitudinally across the carrier wall. The arrangement is thus substantially symmetrical about a median plane lying in a circumferential direction and bisecting the carrier segment 150 midway between the front and rear ends 152F, 152R.

By virtue of the advantageously configured undulations formed in the carrier wall by the part-conical surface formations at or adjacent the front end section 152F, it is now possible to provide a series of access conduits, channels or through-holes 190 in the front end wall section 152F to allow delivery of cooling air from the outboard source to the radially inward cooling chamber 170 from a location radially outwardly of the NGV-supporting flange/flap plate rail 149, thereby avoiding the need to negotiate the difficult sealing arrangement typically found at this location.

A plurality of like carrier segments 150 can be used to build up a complete circumferential annular carrier section or ring, as is already in common practice with known carrier segments. To assist in this and the placement of neighbouring carrier segments accurately and stably together side by side, one or more anti-rotation lugs 156 or other anchoring or locking features (as in FIG. 4) may be provided at any suitable or appropriate location, e.g. on a radially outermost carrier rail at the front end 152F of the carrier segment 150, or possibly at one or more other locations, e.g. as may be most appropriate according to the overall geometry of the carrier segment and/or ring to be assembled.

Figure 5:
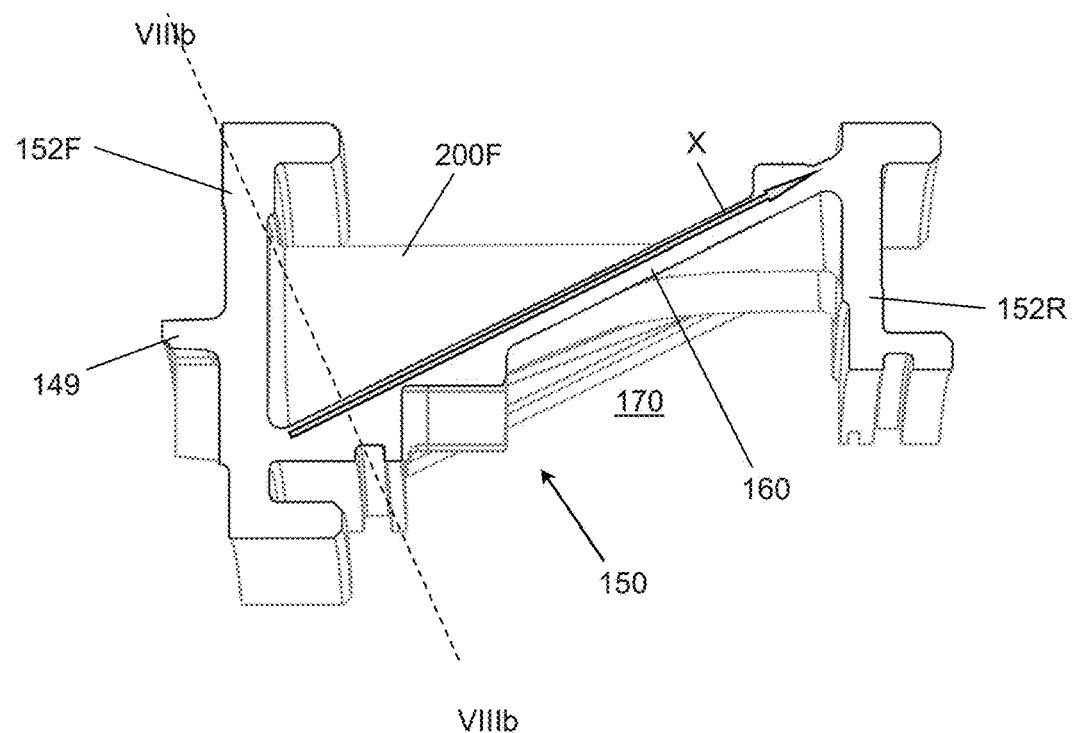
FIG. 5 is a cross-sectional view on plane V-V of FIG. 4.

FIG. 5 shows the carrier segment 150 in cross-section viewed on plane V-V of FIG. 4. As can be seen more clearly here, the carrier wall 150 extends between the front and rear end sections 152F, 152R with a general orientation at a shallow angle, e.g. of up to around 20 or 30°, relative to the engine axis. This is primarily in order to optimise the carrier's strength and integrity under the potentially high axial thrust loads, e.g. directed along vector X, placed upon it by the NGVs and other components in this region of the engine.

Figure 6:
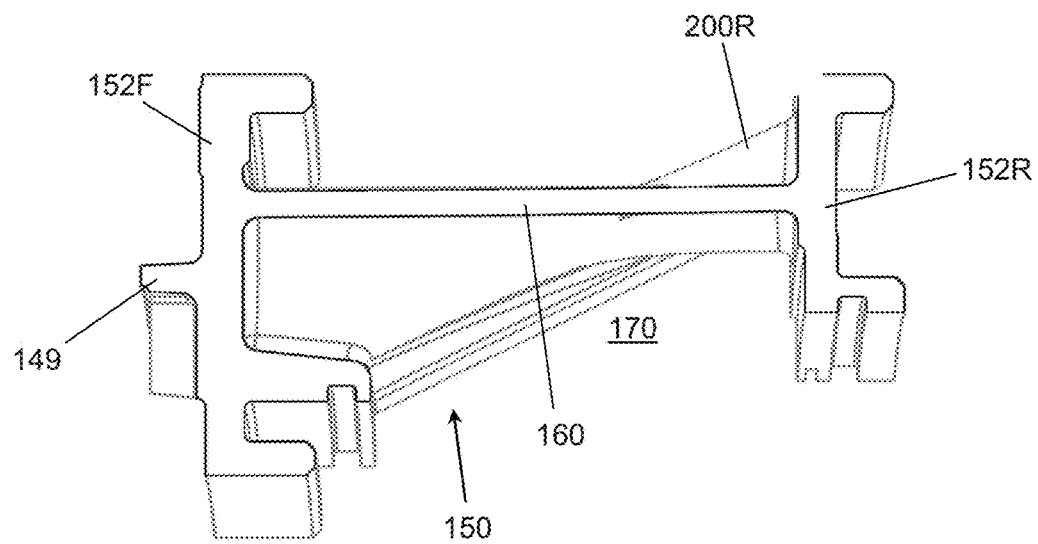
FIG. 6 is a cross-sectional view on plane VI-VI of FIG. 4.

FIG. 6 shows the carrier segment 150 in cross-section viewed on plane VI-VI of FIG. 4. As can be seen more clearly here, the series of conduits, channels or through-holes 190 in the front end section 152F which carry cooling air into the chamber 170 can be conveniently located radially outwardly of (i.e. above, in this Figure's orientation) the NGV-supporting flange/flap plate rail 149.

Figure 7A:
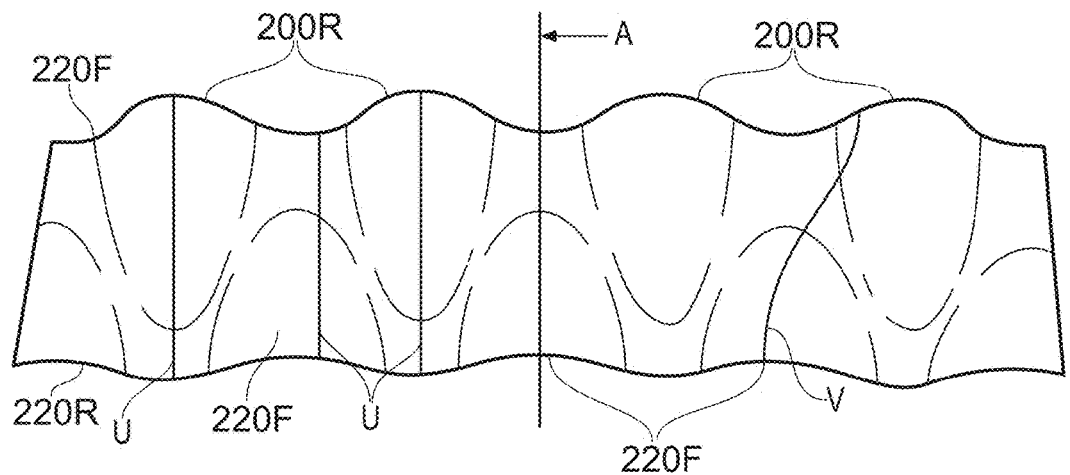
FIG. 7(a) is a rear perspective view of the undulating carrier wall only of the carrier segment of FIG. 4.

FIG. 7(a) shows the carrier wall alone, with its characteristic generally part-conical surface formations 200F (i.e. front end limit curve) and 200R (i.e. rear end limit curve). As shown here, a preferred geometry of the undulating surface is preferably designed such that: plane A is coincident with the longitudinal engine axis; the lines U bisecting each peak of adjacent conical sections within each series 200F, 200R are preferably arranged to be as near to parallel to plane A as possible; and line V which defines a locus at a constant radial distance from the longitudinal engine axis is not allowed to bridge (or rather link) the peaks in one series of conical sections to respective peaks in the other series at any point along its length.

Figure 7B:
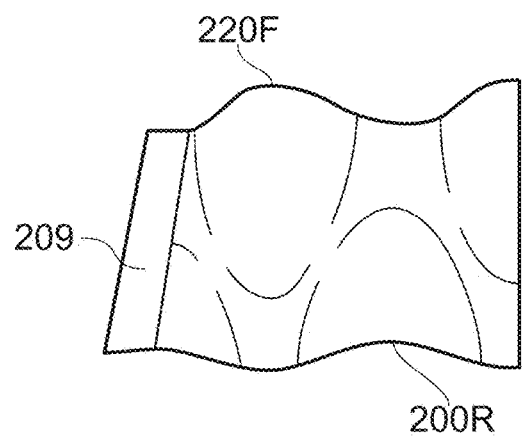
FIG. 7(b) is a rear perspective view of a portion of the carrier wall of FIG. 7(a)

For greater clarity FIG. 7(b) shows just the left-hand portion of the carrier wall shown in FIG. 7(a). As shown here, an edge region 209 of the carrier wall (which may be at one only or possibly at both terminal circumferential ends of the carrier wall) may be defined with a minimum curvature in order to simply the strip seal groove geometry via which the carrier segment is joined to a neighbouring carrier segment.

Figure 8A:
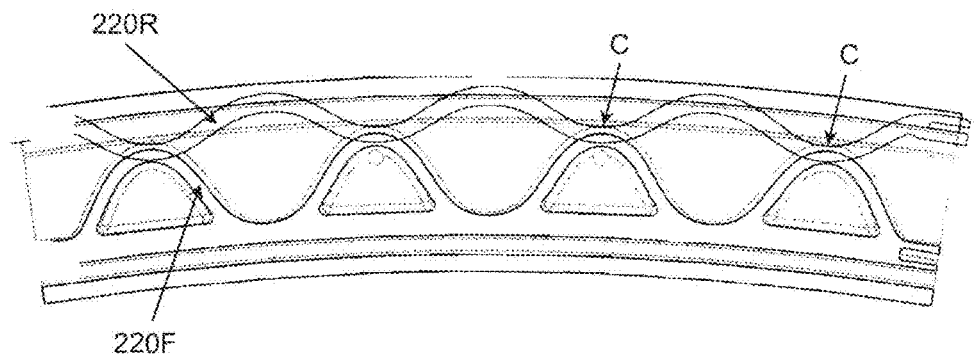
FIG. 8(a) is a schematic diagram showing the waveforms of the limiting front and rear curves of the carrier wall of the carrier segment of FIG. 4, as viewed in a plane normal to the engine axis, i.e. substantially from the opposite direction as the view shown in FIG. 7(a)
Figure 8B:
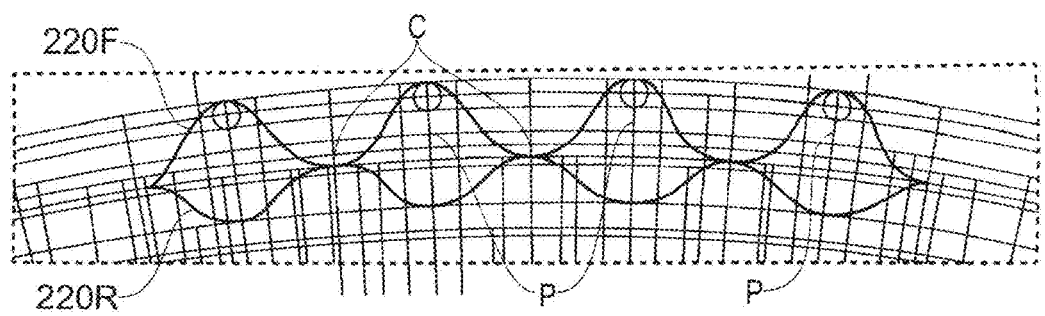
FIG. 8(b) is a schematic diagram showing the waveforms of the limiting front and rear curves of the front and rear side wall of the carrier wall of the carrier segment of FIG. 4, similar to FIG. 8(a) but as viewed in a plane "VIIIb-VIIIb" as seen in FIG. 5.

FIG. 8(a) shows schematically in greater detail the waveforms of the frontmost and rearmost curves (i.e. wave functions) of the carrier wall of FIG. 4, as viewed in a plane normal to the engine axis, i.e. substantially from the opposite direction as the view shown in FIG. 7(a). FIG. 8(b) shows schematically in greater detail the corresponding waveforms of the frontmost and rearmost curves (i.e. wave functions) of the carrier wall of FIG. 4, similar to FIG. 8(a) but as viewed in a plane "VIIIb-VIIIb" as seen in FIG. 5. It is to be noted in FIGS. 8(a) and (b) that preferably: at points C, front and rear curve maxima and minima are coincident; and at points P, the high and low limit points through lines parallel with plane A in FIG. 7(a) are aligned with one other.

Figure 9:
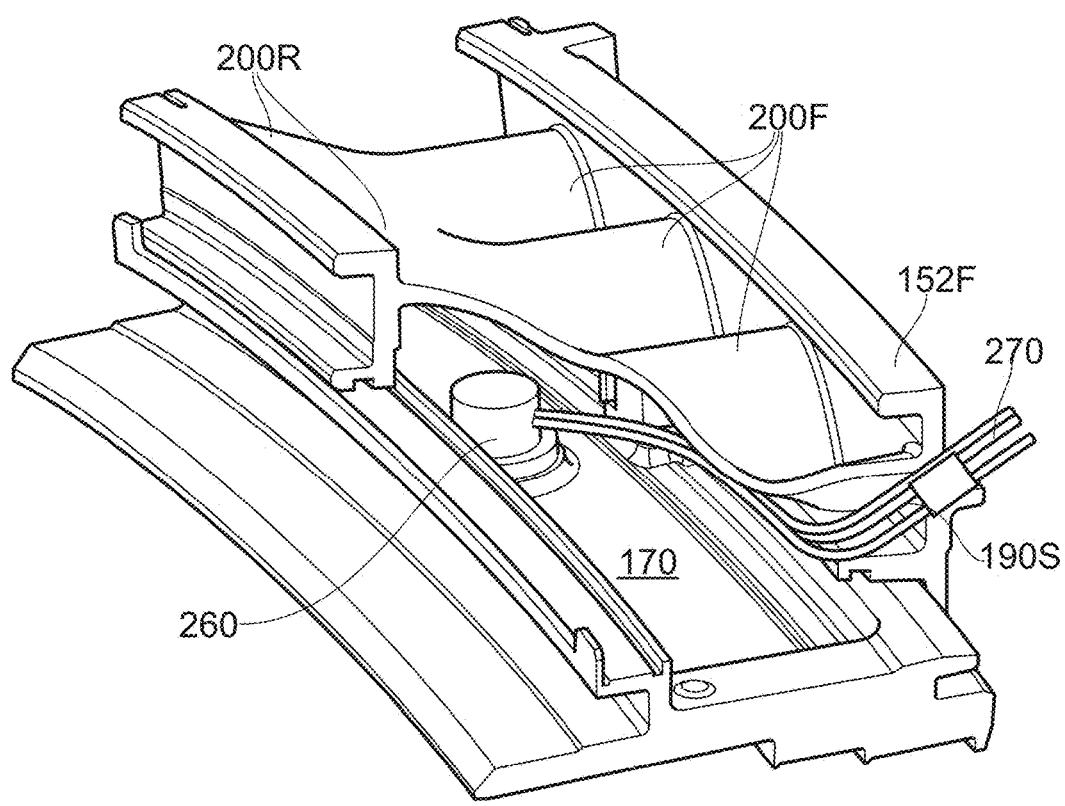
FIG. 9 is a part-cut-away perspective view of the embodiment of FIG. 4, but viewed from the opposite side, and showing an example of the placement of a sensor for use in monitoring engine operational parameters.

FIG. 9 shows in part-cut-away perspective, corresponding to FIG. 4 but viewed from the opposite side, an example of the placement of a sensor 260 within the cooling chamber 170 for use in monitoring engine operational parameters, either in an in-use engine or in an experimental or test set-up. The sensor 260 has electrical supply and/or control wires or cables 270 which can be conveniently passed through one 190S of (or a dedicated extra one of) the conduits, channels or through-holes 190 provided in the front end wall section 152F of the carrier segment, in a like radial position to the others used for feeding the cooling air into the chamber 170.

Figure 10A:
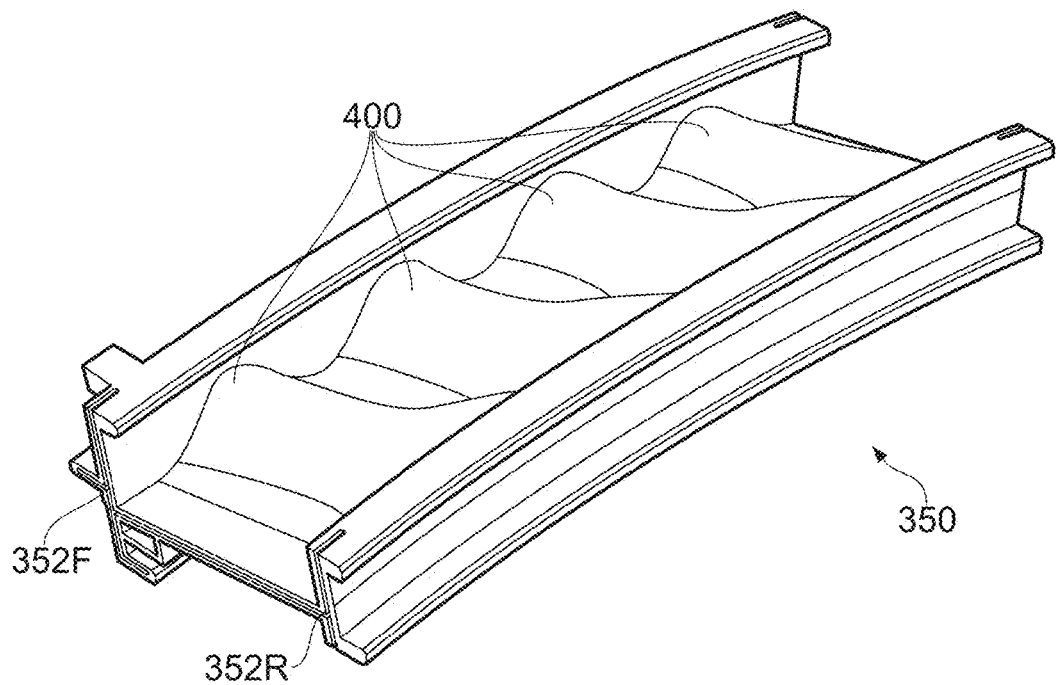
FIGS. 10(a) and 10(b) are, respectively, a rear perspective view and a front perspective view of another, somewhat simpler, carrier segment for use in an HP carrier section, in accordance with a second embodiment of the invention.
Figure 10B:
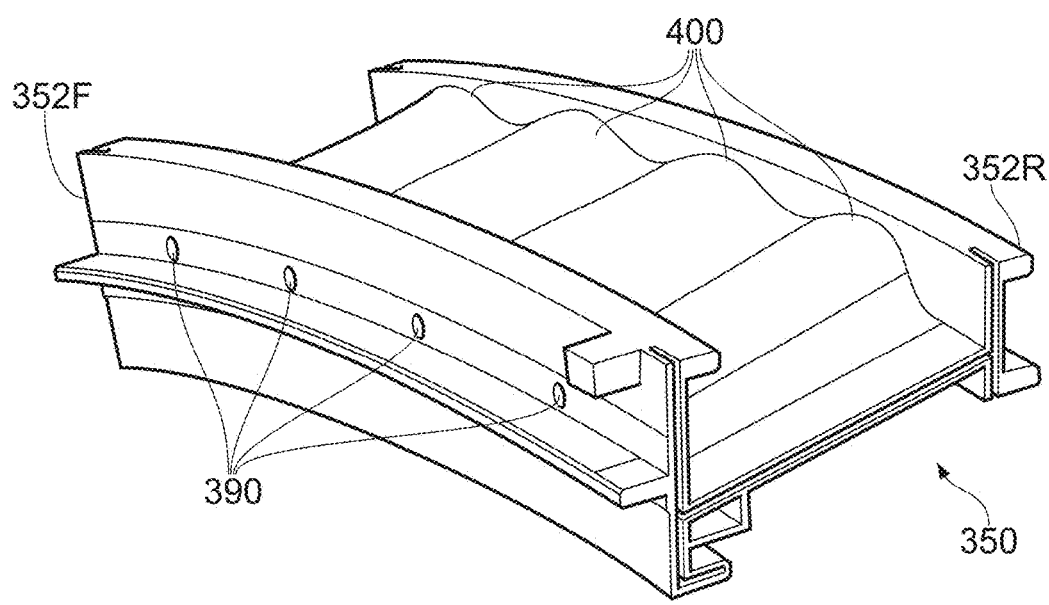

A second, somewhat simpler, embodiment of the invention is shown in FIGS. 10(a) and 10(b). These show in rear and front perspective an alternative carrier segment 350 for use in building up, with other like carrier segments 350, an overall HP carrier section or ring, but here the undulations of the carrier wall are simpler in shape and configuration. Here the undulations 400 are substantially uniform in their wave function and wavelength in any given circumferential direction at any point (i.e. longitudinal position) between the front and rear carrier ends. Again a series of conduits, channels or through-holes 390 are provided in the front end wall or section 352F for feeding cooling air into the cooling chamber 370 defined radially inwardly of the carrier wall.

However, in practice it may be expected that this configuration of carrier wall shown in FIGS. 10(a) and 10(b) may be somewhat less preferred than the more complex configuration of the first embodiment shown in FIGS. 4 to 9, because of the lower inherent strength, rigidity and stiffness of this three-dimensional shape for withstanding high thrust loads placed upon it during use. However any optimum shape or configuration may be selectable to meet individual demands of any given engine.

It is to be understood that the above description of embodiments and aspects of the invention has been by way of non-limiting examples only, and various modifications may be made from what has been specifically described and illustrated whilst remaining within the scope of the invention as defined in the appended claims.

Throughout the description and claims of this specification, the words "comprise" and "contain" and variations of the words, for example "comprising" and "comprises", mean "including but not limited to", and are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Furthermore, features, integers, components, elements, characteristics or properties described in conjunction with a particular aspect, embodiment or example of the invention are to be understood to be applicable to any other aspect, embodiment or example described herein, unless incompatible therewith.

The invention claimed is:

1. A carrier segment for forming a carrier section for one or more gas turbine engine components, the carrier segment including a carrier wall extending between front and rear carrier end walls and having a circumferential profile arranged, in use, with respect to an axis of the carrier segment, wherein
   the circumferential profile of the carrier wall is undulating,
   the carrier front end wall comprises at least one conduit, channel or through-hole therethrough for passage of cooling air, and
   each conduit, channel or through-hole is located such that at least its exit is adjacent to a radially inner face, with respect to the axis, of the carrier wall and is positioned radially within a respective radially-outwardly-pointing or -extending undulation of the carrier wall such that the exit is positioned between a maximum radius and a minimum radius of the carrier wall at the respective radially-outwardly-pointing or -extending undulation.

2. A carrier segment according to claim 1, wherein the carrier wall has a substantially uniform cross-sectional thickness.

3. A carrier segment according to claim 1, wherein the carrier wall further comprises a radially outer face with respect to the axis, at least the radially inner face including an undulating surface profile defined by a wave function.

4. A carrier segment according to claim 3, wherein the carrier wall has an undulating wave profile which is substantially identical in any given circumferential direction between the front and rear carrier end walls.

5. A carrier segment according to claim 3, wherein the carrier wall has an undulating wave profile which varies in wave function and/or wavelength in a plurality of circumferential directions traversing longitudinally between the said front and rear carrier end walls.

6. A carrier segment according to claim 5, wherein at least the wave function, of the carrier wall profile in a circumferential direction varies symmetrically traversing in opposite longitudinal directions to either side of a longitudinally central circumferential direction midway between the said front and rear carrier end walls.

7. A carrier segment according to claim 6 wherein the wavelength of the wave function in a circumferential direction varies symmetrically traversing in opposite longitudinal directions to either side of a longitudinally central circumferential direction midway between the front and rear carrier end walls.

8. A carrier segment according to claim 5, wherein the wave function which defines the circumferential carrier wall profile starting from the front carrier end wall decreases in amplitude as the wave function traverses longitudinally towards the rear carrier end wall, and the wave function which defines the circumferential carrier wall profile starting from the rear carrier end wall decreases in amplitude as the wave function traverses longitudinally towards the front carrier end wall.

9. A carrier segment according to claim 8, wherein the carrier wall comprises a front portion and a rear portion, the front portion having a profile comprising a series of a plurality of first part-conical surface formations, and the rear portion having a profile comprising a series of a plurality of second part-conical surface formations, wherein the series of first part-conical surface formations are at least partially interleaved in a circumferential direction with the series of second part-conical surface formations, and wherein the series of first and second part-conical surface formations are inverted in a front-to rear sense relative to each other, with the wider ends of the conical surfaces of each of the first and second series being located respectively at the front and rear carrier end walls, as the case may be, of the carrier segment.

10. A carrier segment according to claim 9, wherein the respective conical surfaces of the first and second series are of substantially the same shape or profile as each other, so that the overall carrier wall is substantially symmetrical either side of a median plane bisecting the carrier wall midway between its front and rear carrier end walls.

11. A carrier segment according to claim 1, wherein the carrier wall has a front end edge profile which is defined by a first wave function and a first wavelength, and a rear end edge profile which is defined by a second wave function and a second wavelength, wherein:
  (i) the first and second wave functions are substantially the same or substantially different from each other; and/or
  (ii) the first and second wavelengths are substantially the same or substantially different from each other.

12. A carrier segment according to claim 11, wherein:
  (i) the first wave function is substantially an inverse of the second wave function (or vice versa); or
  (ii) the first wavelength is substantially equal the second wavelength but the first and second wave functions are offset relative to one another in a circumferential direction by half of the undulating wavelength.

13. A carrier segment according to claim 1, wherein a wave function defining the undulating pattern in a circumferential direction at any particular longitudinal position traversing the carrier wall between its front and rear carrier end walls is a regular repeating wave having a constant or a regularly varying wavelength and/or amplitude.

14. A carrier segment according to claim 13, wherein:
  (i) the wave function defines a relatively simple shape defined by a part-cylindrical, part-polygonal, part-spherical, part-parabolic or part-hyperbolic curve; or
  (ii) the wave function defines a more complex shape derived from any combination of two or more of any of the curves, shapes or mathematical functions in (i) above.

15. A carrier segment according to claim 1, wherein the carrier segment includes a circumferential terminal portion at one circumferential end thereof which terminates with an edge profile which substantially matches an edge profile of a circumferential terminal portion at an opposite circumferential end of a second, like carrier segment, whereby the two carrier segments are unitable together via their respective circumferential ends to form a carrier segment pair.

16. A carrier segment according to claim 1, further comprising a flap plate rail extending axially from the front carrier end wall in a direction opposite the carrier wall, wherein each conduit, channel or through-hole is located radially outward of the flap plate rail with respect to the axis.

17. A carrier section or ring for supporting or at least partially enshrouding one or more gas turbine engine components, the carrier section comprising a plurality of carrier segments according to claim 1.

18. A gas turbine engine comprising a carrier section according to claim 17.

19. A carrier segment for forming a carrier section for one or more gas turbine engine components, the carrier segment including a carrier wall extending between front and rear carrier ends and having a circumferential profile arranged, in use, with respect to an axis of the carrier segment, wherein the circumferential profile of the carrier wall is undulating, wherein
  the carrier wall has an undulating wave profile which varies in wave function and/or wavelength in a plurality of circumferential directions traversing longitudinally between the said front and rear carrier ends.

20. A carrier segment according to claim 19, wherein at least the wave function, of the carrier wall profile in a circumferential direction varies symmetrically traversing in opposite longitudinal directions to either side of a longitudinally central circumferential direction midway between the said front and rear carrier ends.

21. A carrier segment according to claim 20, wherein the wavelength of the wave function in a circumferential direction varies symmetrically traversing in opposite longitudinal directions to either side of a longitudinally central circumferential direction midway between the front and rear carrier ends.

* * * * *